Oct. 28, 1924.  
G. H. LUDLOW ET AL  
1,513,117  
SHIPPING CRATE FOR SCALES  
Filed Dec. 3, 1923    2 Sheets-Sheet 1

Oct. 28, 1924.
G. H. LUDLOW ET AL.
1,513,117
SHIPPING CRATE FOR SCALES
Filed Dec. 3, 1923
2 Sheets-Sheet 2
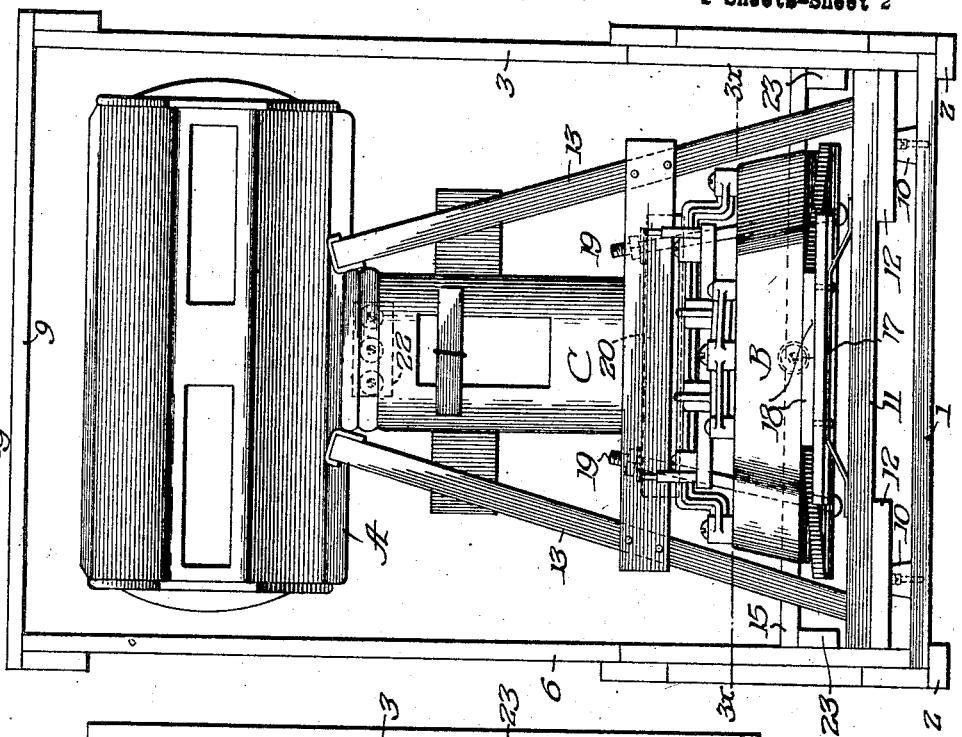
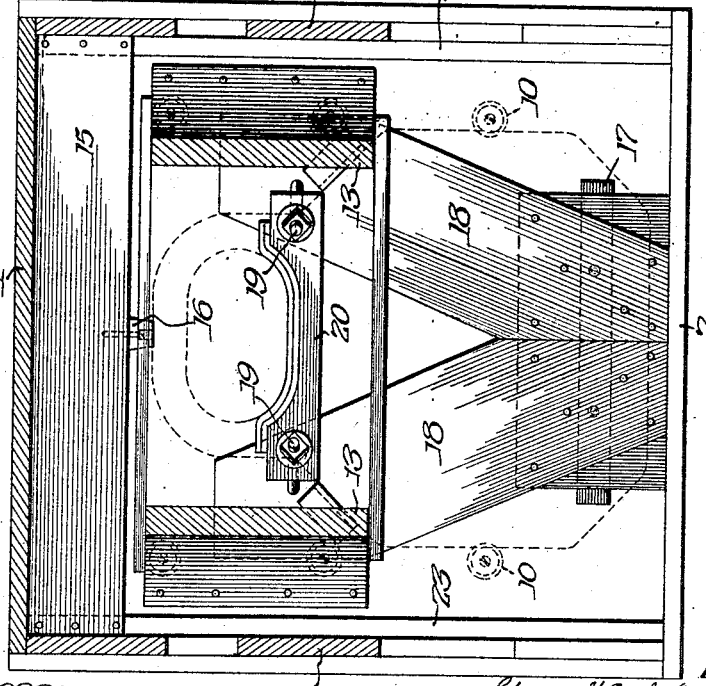

Patented Oct. 28, 1924.

1,513,117

UNITED STATES PATENT OFFICE.

GEORGE H. LUDLOW, OF EVANSTON, AND DONALD W. ADAMS, OF CHICAGO, ILLINOIS, ASSIGNORS TO SANITARY SCALE COMPANY, OF CHICAGO, ILLINOIS, A CORPORATION OF ILLINOIS.

SHIPPING CRATE FOR SCALES.

Application filed December 3, 1923. Serial No. 678,339.

*To all whom it may concern:*

Be it known that we, GEORGE H. LUDLOW and DONALD W. ADAMS, citizens of the United States, residing, respectively, at Evanston, in the county of Cook and State of Illinois, and at Chicago, in the county of Cook and State of Illinois, have jointly invented certain new and useful Improvements in Shipping Crates for Scales, of which the following is a specification.

This invention relates to the crating of weighing scales of the type having a vertical standard and a horizontally offset scale base.

The primary object of the invention is to sustain the scale in the crate under conditions which will avoid transmitting shocks of compression from one to another of the superimposed parts which make up the scale, and particularly those parts of the scale which enclose and support the scale mechanism; and to this end, one feature of the invention consists in mounting the scale in a frame which sustains the scale pendulously by engagement with the upper portion of the scale and holds the base of the scale out of contact with lower portions of the crate so that shocks incident to dropping the crate cannot be transmitted as shocks of compression.

Another object of the invention is to relieve the scale of a part of the load transmitted from the base, through the column, to the upper portion by which it is suspended; and to this end, another feature of the invention consists in angularly displacing the scale from its natural position of pendulous repose, in which its center of gravity would be vertically beneath its center of support, and resiliently holding the scale off center so that vertical shock will be translated to a substantial degree into a horizontal swinging moment and absorbed by the resilient displacing means, thereby relieving from serious strains of tension the connections between the several members of the scale which lie below the pendulous supports; a subordinate feature incident to this part of the invention consisting in the utilization of the horizontally offset scale base for absorbing a portion of the vertical shock by introducing a spring between the frame base and that portion of the scale base which is remote from the column of the scale, and, therefore, has a substantial downward movement in the tendency of the scale to swing to dead center.

Still another object of the invention is to provide a simple and efficient construction of mounting frame for the scale, and one which can be conveniently introduced into and withdrawn from the housing of the crate while the scale is mounted thereon; also to provide means whereby the angular displacement of the scale from dead center will result from sliding the frame into the housing; also to provide convenient means through which to introduce the vertical sustaining spring between the base of the frame and the base of the scale in a position horizontally offset from the column; and to these several additional ends, further features of the invention consist in certain elements of construction and coordination of parts of the crate which are hereinafter described in detail, and the novel features of which are particularly pointed out in the claims.

In the drawings—

Figure 2 is a front elevation of the crate and its contained scale, the front walls of the crate being removed; and Figure 3 is a horizontal section on the line 3×—3× of Figures 1 and 2, but without the scale.

Figure 1:
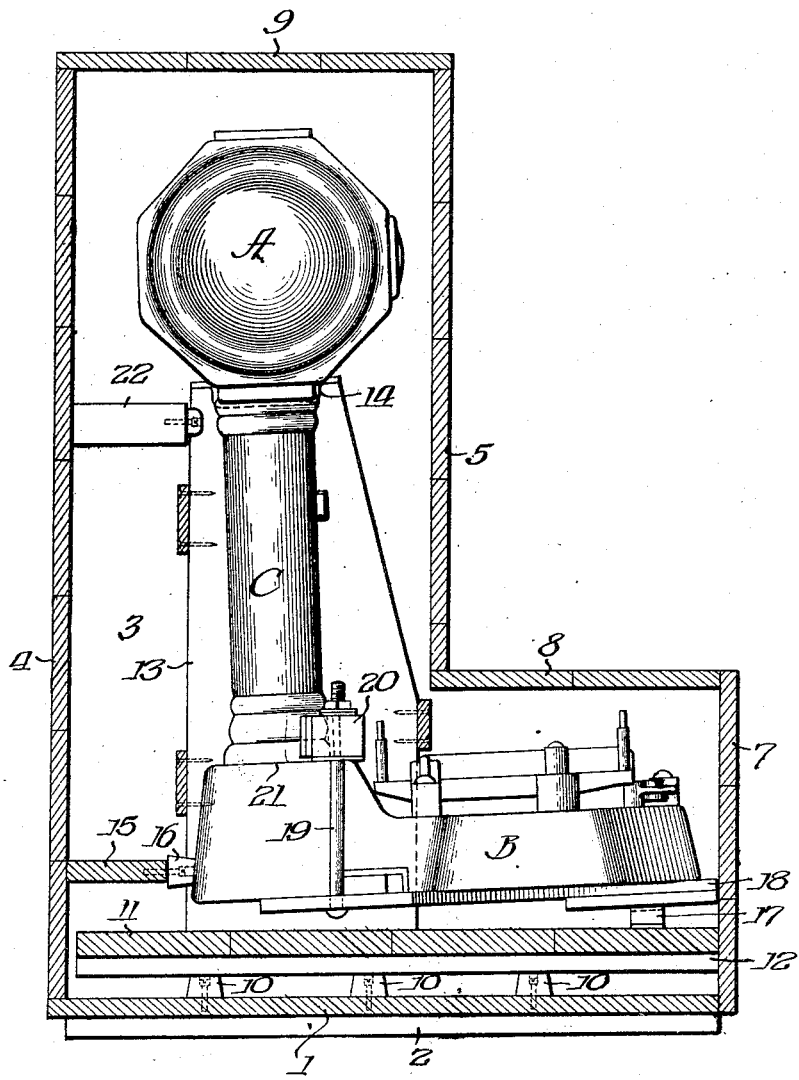
Figure 1 is a vertical section of the crate in an intermediate plane extending in the direction of movement of the crating frame into and out of the housing, the crated scale being shown in side elevation.

1 represents the bottom of the crate housing which is preferably provided with fixed cleats 2; 3, 4, 5, 6, and 7 represent lateral confines of the crate which may be in the nature of a solid closure, or of slatted or other open construction; and 8 represents a deck and 9 the top of the housing. These elements of the housing are, of course, designed with special reference to the form of goods to be enclosed, being intended in the present instance to protect a scale which is of the type having a vertical column with a base horizontally offset from the column for the reception of a lever system, platform, or other scale mechanism.

Located upon the bottom 1 are cushions 10 which are so arranged as to give an area of vertical support upon the bottom 1 which is of very much less horizontal extent than the whole horizontal area of the housing, and thereby provide for depression of margins of the scale support, and especially front and rear margins thereof, with resultant absorption of shock, in accordance with the principle set forth in U. S. Letters Patent of Whitworth and Roderick No. 1,483,684 dated February 12, 1924, and with the disclosure of which the construction of the housing now employed may conform.

Supported upon the bottom 1. through the medium of the cushions 10, is a frame base 11 having bottom cleats or runners 12, and from this base rises a pair of crutch-like shores 13 converging upwardly and terminating in saddles 14 through which they receive the cross-head A of the scale to be shipped; the vertical dimension of the shores 13 being such that they suspend the scale in a pendulous manner with the base B of the scale spaced well above the frame base 11, so that the weight of the base B and intermediate column C are imposed as a load of tension upon the head A and transmitted through the head to the shores. An important advantage in thus supporting the scale, and particularly one of the type which embodies an enlarged head and a base connected with the head through the medium of a column, is that these members of the scale are saved from injurious shocks that would otherwise develop from dropping the crate upon its bottom 1, which shocks have been found in practice to seriously injure the parts, and particularly when the parts are surfaced with vitreous enamel.

As a further safeguard against vertical shock and also for the purpose of confining the scale against pendulous action upon its bearings 14, a stop 15 is mounted upon the crate, for instance, upon the wall 4 independently of the mounting frame 11—13, in position to encounter the base B of the scale when the frame 11—13 is slid into the housing; the dimension of the stop 15 being such that it swings the scale upon its pendulous supports 14 and angularly displaces it in the direction of the horizontal offset of the base B a distance which removes the center of gravity of the scale from the vertical line of support and thus translates vertical shock into a substantial horizontal moment of the lower end of the scale in the direction of the stop 15, and this stop is provided with a cushion 16 through which it absorbs that portion of the shock which is thus directed horizontally. To further sustain the scale against swinging movement upon its bearings 14, a spring 17 is introduced between the frame base 11 and that end of the scale base B which is remote from the vertical line of scale support, and where by reason of the horizontal offset there is a substantial downward moment of the scale base; and in order to apply this spring 17 to the scale base, a shoe 18 is fitted to the underside of the scale base and there secured by any suitable means, such, for instance, as bolts 19 passing through the yoke 20 that rests upon the pedestal 21 of the scale base. Shoe 18, being thus secured against both lateral and longitudinal displacement relatively to the base B, is employed for the further purpose of confining the scale against outward swinging movement by having the outer end of said shoe abut against the front wall 7 of the housing.

Outward tipping motion of the upper end of the mounting frame 11—13, with its contained scale, is resisted by the substantial horizontal offset of the frame base 11 beyond the center of mass, and tipping in the opposite direction will be limited by a stop 22 in position to receive the upper end of the column C, also by the side cleats 23 which are slightly spaced above the frame base 11 on the sides 3 and 6 of the housing, and which also limit the rising of the scale and its mounting frame as a whole from the supporting bottom of the crate.

From the foregoing description it will be seen that while the bearings formed on the upper ends of the shores to receive the shoulders of the scale are not constructed with any special reference to free oscillation of the scale in said bearings, this support is nevertheless such as will permit oscillation sufficient to avoid imparting transverse strains to the whole structure, and the organization as a whole is such as to provide a scale mounting frame having supports which engage the scale above its center of mass, and by such engagement suspend the scale upon a horizontal axis of oscillation with the bottom of the scale above and therefore out of vertical bearing upon the base of the frame, means being provided for resiliently resisting oscillation of the scale about said axis.

We claim:

1. In a shipping crate for weighing scales, supports constructed to receive and engage an upper portion of a scale and pendulously suspend the scale with its bottom above the base of the crate, and means for engaging the scale in directions to limit the pendulous action of the scale in its said supports.

2. In combination, a weighing scale, a shipping crate therefor constructed with bearings engaging the scale above its center of mass and pendulously supporting the scale by such engagement; means being provided for limiting pendulous action of the scale while so supported.

3. In combination, a weighing scale and a shipping crate therefor having supports engaging the weighing scale above its center of mass and pendulously suspending it with the bottom of the scale above the base of the crate, and means engaging the lower portion of the scale in the direction of pendulous action and limiting such action.

4. In combination, a weighing scale and a shipping crate for said weighing scale, having supports engaging the scale above its center of mass and by such engagement pendulously supporting the scale with the bottom of the scale above the base of the crate, and resilient means engaging the scale in the direction of pendulous action and yieldingly resisting such action.

5. In combination, a weighing scale, a shipping crate for said weighing scale having means engaging the scale above its center of mass and by such engagement suspending the scale with its bottom free from vertical bearing, and means for resisting swinging movement of the scale in its supports.

6. In combination, a weighing scale, a shipping crate for said weighing scale having means engaging the scale above its center of mass and by such engagement suspending the scale with its bottom free from vertical bearing, and means for resisting swinging movement of the scale in its supports, normally holding the scale with its center of mass displaced from the vertical line of scale support.

7. In combination, a weighing scale, a shipping crate for said weighing scale having means engaging the scale above its center of mass and by such engagement suspending the scale with its bottom free from vertical bearing, and means for resisting swinging movement of the scale in its supports, resiliently holding the scale with its center of mass displaced from the vertical line of support.

8. In combination, a weighing scale of the type having vertical standards and bases horizontally offset from their standards, a shipping crate having supports engaging said scale above its center of mass and by such engagement pendulously suspending the scale upon an axis of oscillation transverse to the direction of offset of the scale base and with said scale base free from vertical bearing upon the crate, and means engaging the scale in the direction of said offset and thereby limiting its oscillation about said axis.

9. In combination, a weighing scale of the type having vertical standards and bases horizontally offset from their standards, a shipping crate having supports engaging said scale above its center of mass and by such engagement pendulously suspending the scale upon an axis of oscillation transverse to the direction of offset of the scale base and with said scale base free from vertical bearing upon the crate, and means engaging the scale in the direction of said offset and thereby limiting its oscillation about said axis; said last-named means comprising a resilient member inserted between an offset portion of the scale base and a portion of the crate beneath the same.

10. In combination, a weighing scale of the type having standards and bases horizontally offset therefrom, and a shipping crate for said scale comprising spaced supports engaging the scale above its center of mass, and by such engagement sustaining the scale upon an axis of oscillation transverse to the direction of offset of the scale base with the bottom of the scale free from vertical bearing upon the crate, and means resiliently mounting the scale in the direction of said offset at a level remote from said axis of oscillation, and holding the scale at an angle to the position of suspension which it naturally tends to assume upon its support.

11. In combination, a weighing scale of the type having standards and bases horizontally offset therefrom, and a shipping crate for said scale comprising spaced supports engaging the scale above its center of mass, and by such engagement sustaining the scale upon an axis of oscillation transverse to the direction of offset of the scale base with the bottom of the scale free from vertical bearing upon the crate, and means resiliently mounting the scale in the direction of said offset at a level remote from said axis of oscillation, and holding the scale at an angle to the position of suspension which it naturally tends to assume upon its support; said last-named means comprising a resilient stop engaging the scale in the direction of said offset, and a resilient member introduced between an offset portion of the scale base and a portion of the crate.

12. A shipping crate for weighing scales having bearings adapted to engage a scale above its center of mass and by such engagement support the scale with its bottom free from vertical bearing upon the crate, and a shoe adapted for attachment to the bottom of the scale and having a resilient member positioned thereon to bear upon the crate at a point horizontally offset from the vertical line of scale support, when said shoe is attached to the scale.

13. A shipping crate for weighing scales having bearings adapted to engage a scale above its center of mass and by such engagement support the scale with its bottom free from vertical bearing upon the crate, and a shoe adapted for attachment to the bottom of the scale and having a resilient member positioned thereon to bear upon the crate at a point horizontally offset from the vertical line of scale support, when said shoe is attached to the scale; said resilient member being proportioned to urge the scale toward a position angularly displaced from its natural position of suspension upon the crate bearings.

14. In a shipping crate for weighing scales, a scale mounting frame removably adapted to said crate and constructed with supports which engage a scale above the center of mass of the scale and by such engagement support the scale upon a horizontal axis of oscillation, and with the bottom of the scale free from vertical bearing upon the crate, and a stop carried by the crate independently of the mounting frame in position to engage the scale when the frame and scale are in place in the crate and thereby limit oscillation of the scale upon said axis.

15. In a shipping crate for weighing scales, a scale mounting frame removably adapted to said crate and constructed with supports which engage a scale above the center of mass of the scale and by such engagement support the scale upon a horizontal axis of oscillation and with the bottom of the scale free from vertical bearing upon the crate, and a stop carried by the crate independently of the mounting frame, in position to engage the scale when the frame and scale are in place in the crate, and thereby limit oscillation of the scale upon said axis, means being inserted between the scale and frame which also limit such oscillation.

16. In a shipping crate for weighing scales, a scale mounting frame removably adapted to said crate and constructed with upports which engage a scale above the center of mass of the scale and by such engagement support the scale upon a horizontal axis of oscillation, and with the bottom of the scale free from vertical bearing upon the crate, and resilient means adapted to enter between the scale so supported and a portion of the mounting frame, and thereby limit oscillation of the scale upon said axis.

17. In a shipping crate for weighing scales, a crate housing having a bottom, a resilient bearing carried by said bottom, a scale mounting frame adapted to rest upon said resilient bearing in said housing, and supports on said frame adapted to engage a scale above its center of mass and support the scale upon a horizontal axis of oscillation and with the bottom of the scale out of vertical bearing upon the frame.

18. In a packing case for weighing scales, a housing, and a scale mounting frame adapted to said housing, comprising a frame base and supports rising from said frame base and constructed on their upper portions with bearings adapted to engage a scale above its center of mass and by such engagement support the scale upon a horizontal axis of oscillation, and with the bottom of the scale above the base of the frame.

19. In a packing case for weighing scales, a housing, and a scale mounting frame adapted to said housing, comprising a frame base and supports rising from said frame base and constructed on their upper portions with bearings adapted to engage a scale above its center of mass and by such engagement support the scale upon a horizontal axis of oscillation, and with the bottom of the scale above the base of the frame; said housing being adapted to engage the scale in a horizontal direction transverse to said axis of oscillation and resist such oscillation of the scale.

20. In a packing case for weighing scales, a housing, and a scale mounting frame adapted to said housing, comprising a frame base and supports rising from said frame base and constructed on their upper portions with bearings adapted to engage a scale above its center of mass and by such engagement support the scale upon a horizontal axis of oscillation, and with the bottom of the scale above the base of the frame; said housing being adapted to engage the scale in a horizontal direction transverse to said axis of oscillation and resist such oscillation of the scale; said last-named means being positioned to normally displace the scale from the vertical position of suspension which it naturally assumes upon said axis.

21. In a shipping crate for weighing scales, a frame composed of a base and shores extending upwardly from said base, and constructed on their upper portions with bearings that receive the upper portion of the scale and pendulously suspend the scale with its base above the frame base; means being provided for controlling the pendulous action of the scale in its said frame.

22. In combination, a shipping crate, a mounting frame in said shipping crate comprising a base and shores extending upwardly from said base, and constructed on their upper portions with bearings, a weighing scale having its upper portion engaged by and resting in said bearings and thereby supporting said scale pendulously with the scale base spaced above the base of the frame, and means for limiting pendulous action of the scale.

23. In a shipping crate for weighing scales of the type having a vertical standard and horizontally offset base, a housing having a bottom and enclosing confines supported on said bottom, a scale mounting frame slidable into and out of said housing, said mounting frame comprising a frame base and bearings above said base positioned to engage a scale above its center of mass and by such engagement suspend the scale upon a horizontal axis of oscillation, and with the bottom of the scale above the base of the frame, and a shoe adapted to be attached to the under side of the offset scale base and having a resilient member through which it bears upon the frame base when so attached.

24. In a shipping crate for weighing scales of the type having a vertical standard and horizontally offset base, a housing having a bottom and enclosing confines supported on said bottom, a scale mounting frame slidable into and out of said housing, said mounting frame comprising a frame base and bearings above said base positioned to engage a scale above its center of mass and by such engagement suspend the scale upon a horizontal axis of oscillation, and with the bottom of the scale above the base of the frame, a shoe adapted to be attached to the under side of the offset scale base and having a resilient member through which it bears upon the frame base when so attached, and a stop carried by the housing in position to encounter the scale when the frame is slid into the housing, and coact with said resilient member in resisting oscillation of the scale upon the frame.

GEORGE H. LUDLOW.
DONALD W. ADAMS.